United States Patent
Kawano et al.

(10) Patent No.: US 9,910,677 B2
(45) Date of Patent: Mar. 6, 2018

(54) OPERATING ENVIRONMENT SWITCHING BETWEEN A PRIMARY AND A SECONDARY OPERATING SYSTEM

(71) Applicant: LENOVO (Singapore) PTE, LTD., New Tech Park (SG)

(72) Inventors: Seiichi Kawano, Sagamihara (JP); Kenji Oka, Yokohama (JP); Randall Scott Springfield, Chapel Hill, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 150 days.

(21) Appl. No.: 14/325,064

(22) Filed: Jul. 7, 2014

(65) Prior Publication Data

US 2016/0004539 A1    Jan. 7, 2016

(51) Int. Cl.
*G06F 9/44* (2006.01)
(52) U.S. Cl.
CPC .................................. *G06F 9/441* (2013.01)
(58) Field of Classification Search
CPC ...... G06F 9/441; G06F 9/4406; G06F 9/4418; G06F 8/65; G06F 17/30345
See application file for complete search history.

(56) References Cited

U.S. PATENT DOCUMENTS

| | | | |
|---|---|---|---|
| 7,409,536 B2* | 8/2008 | Guo | G06F 9/4843 713/1 |
| 2005/0228769 A1* | 10/2005 | Oshima | G06F 11/0706 |
| 2006/0010314 A1 | 1/2006 | Xu | |
| 2006/0123201 A1* | 6/2006 | Wu | G06F 9/4406 711/147 |
| 2011/0022832 A1* | 1/2011 | Motohama | G06F 9/441 713/2 |
| 2012/0191961 A1* | 7/2012 | Wu | G06F 1/3275 713/2 |
| 2014/0115308 A1* | 4/2014 | Li | G06F 9/4406 713/1 |

(Continued)

FOREIGN PATENT DOCUMENTS

| | | |
|---|---|---|
| JP | 2001-100983 | 4/2001 |
| JP | 2001-256066 | 9/2001 |

(Continued)

OTHER PUBLICATIONS

Hiroo Shirasaki, "Understanding of Boot Process on Free BSD", Unix Magazine, 2004, 12 pages.

*Primary Examiner* — Mohammed Rehman
*Assistant Examiner* — Alyaa T Mazyad
(74) *Attorney, Agent, or Firm* — Kunzler, PC

(57) ABSTRACT

Provided is a manner of switching between the operating environment of a primary OS and the operating environment of a secondary OS. In certain embodiments, a HDD keeps a runtime image of the secondary OS generated in a system memory. A DMA space for allowing the secondary OS to operate is formed in a physical address space where a memory image of the primary OS is active. The runtime image of the secondary OS is transferred to the DMA space. The operation of the memory image of the primary OS is stopped and the runtime image of the secondary OS is executed in the DMA space. Before activating the memory image of the primary OS, the runtime image of the secondary OS is saved to the HDD again.

20 Claims, 8 Drawing Sheets

(56) References Cited

U.S. PATENT DOCUMENTS

2014/0253515 A1* 9/2014 Luo ................ G06F 3/0414
                                                345/175
2014/0317392 A1* 10/2014 Kawano ........... G06F 9/4406
                                                713/2

FOREIGN PATENT DOCUMENTS

| JP | 2008-107966 | 5/2008 |
| JP | 2014-106546 | 6/2014 |
| WO | 2009/113394 A1 | 9/2009 |

* cited by examiner

OPERATING ENVIRONMENT SWITCHING BETWEEN A PRIMARY AND A SECONDARY OPERATING SYSTEM

FIELD

The present application relates to a technique of switching between the operating environments of a plurality of operating systems capable of operating in the same hardware.

BACKGROUND

There is a need for switching between a plurality of operating systems (OSs) having respective features for execution in the same hardware environment in a laptop personal computer or a desktop personal computer. It is known to operate a plurality of operating systems (OSs) with a virtual environment configured in the same hardware environment. There are the following virtual environment types: a hypervisor type (type 1); and a host OS type (type 2). In some cases, a laptop PC or a desktop PC is equipped with a mobile-type OS developed for use in a tablet terminal or a smartphone, in addition to an OS dedicated for PC such as Windows®, MAC_OS®, or Linux®.

SUMMARY

In the case where a laptop PC is equipped with these two types of OSs, an OS dedicated for PC may be used primarily, while the mobile-type OS may be used for secondary uses in an application using a touch screen or the like. Therefore, in certain embodiments, the primarily used OS may be provided with a memory space, within the system memory that is larger than it otherwise would be.

The present application relates to a method of switching between operating environments of a computer capable of operating in a first operating environment or a second operating environment. The basic principle is to copy a runtime image of a previously-acquired second operating environment into a part of the memory area of a system memory (which may comprise RAM memory) for use in the first operating environment and then to activate the second operating environment while stopping the operation of the first operating environment.

First, the runtime image of the second operating environment is created and kept. Subsequently, a runtime image is transferred to a part of the memory area of the system memory which operates in the first operating environment and used for the first operating environment and then the operation of the first operating environment is stopped. Subsequently, the runtime image is activated and the operation is performed in the second operating environment. If a user switches the operating environment as needed during the operation in the first operating environment, the operation in the second operating environment is able to be started from a state where a runtime image is created. Moreover, a physical address space used for the operation in the first operating environment is not affected by the presence of the second operating environment.

A part of the memory area may be used as a memory area for which it is assured in the first operating environment that swap-out is not performed to a virtual memory after the transfer of a runtime image until the stop of the first operating environment. A part of the memory area can be used as a memory area allocated to a DMA transfer by the first operating environment. A part of the memory area may be a set of discrete memory areas. Therefore, the first operating environment does not need to secure continuous memory areas for the second operating environment.

When transferring a runtime image, the runtime image stored in the discrete memory areas is able to be moved to the continuous memory areas of the system memory in which the runtime image is stored. This eliminates a need for creating a mapping table with addresses used when the runtime image is created. A new runtime image is created and kept at the time of operation in the second operating environment and the first operating environment is activated in response to an event of shifting to the first operating environment, thereby enabling a shift to the first operating environment on demand.

After the shift to the first operating environment, some of the memory areas are released to the first operating environment, thereby preventing the first operating environment from being restricted in an available physical address space because of the presence of the second operating environment. When the first operating environment is stopped, the system context of a device operating in the first operating environment and user data are able to be stored in the system memory. In creating and keeping the runtime image of the second operating environment, it is possible to allocate memory areas of the system memory smaller than in the first operating environment for the second operating environment when having booted from a power-off state.

The first operating environment enables the execution of an operating system which can be loaded in a desktop computer and the second operating environment enables the execution of an operating system which can be loaded in a tablet terminal. In the operation in the first operating environment, the maximum memory resources available in the system memory can be allocated to the first operating environment, while hardware resources more restricted than the first operating environment can be allocated to the second operating environment.

BRIEF DESCRIPTION OF THE DRAWINGS

In order that the advantages of the application will be readily understood, a more particular description of the application briefly described above will be rendered by reference to specific embodiments that are illustrated in the appended drawings. Understanding that these drawings depict only typical embodiments of the application and are not therefore to be considered to be limiting of its scope, the application will be described and explained with additional specificity and detail through the use of the accompanying drawings, in which.

DETAILED DESCRIPTION

[Schematic Configuration of Computer]

Figure 1:
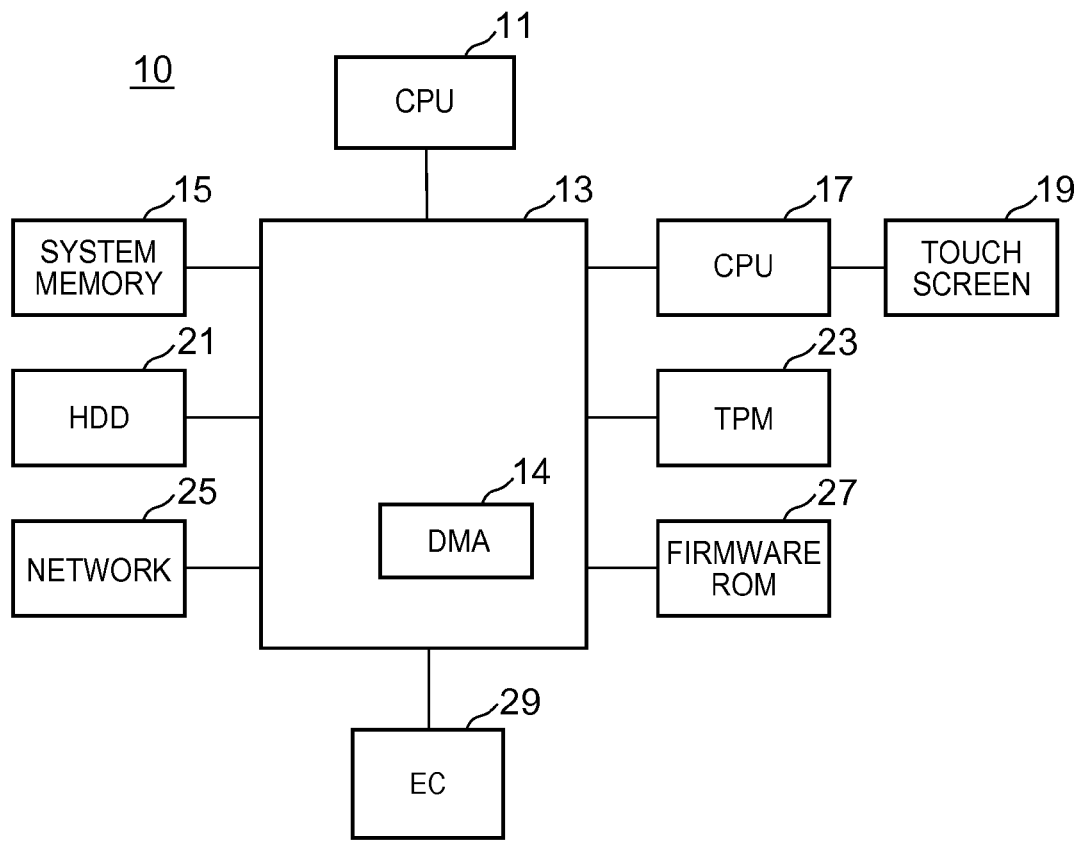
FIG. 1 is a functional block diagram for describing the schematic configuration of hardware of a computer 10.
Figure 2:
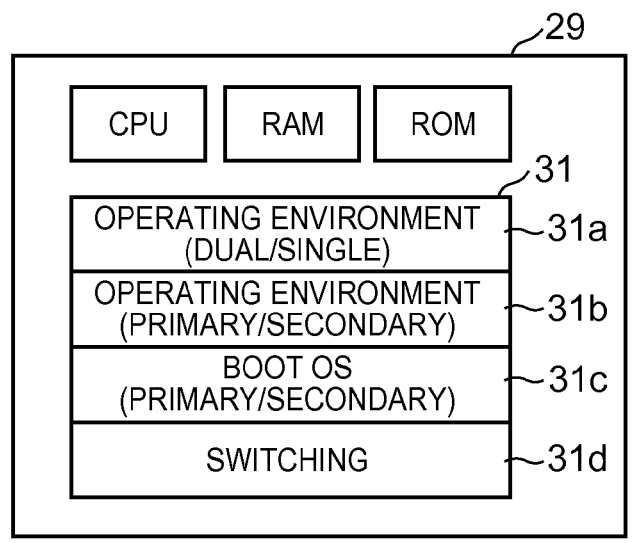
FIG. 2 is a diagram for describing the configuration of a register 31 mounted in an embedded controller (EC) 29.
Figure 3:
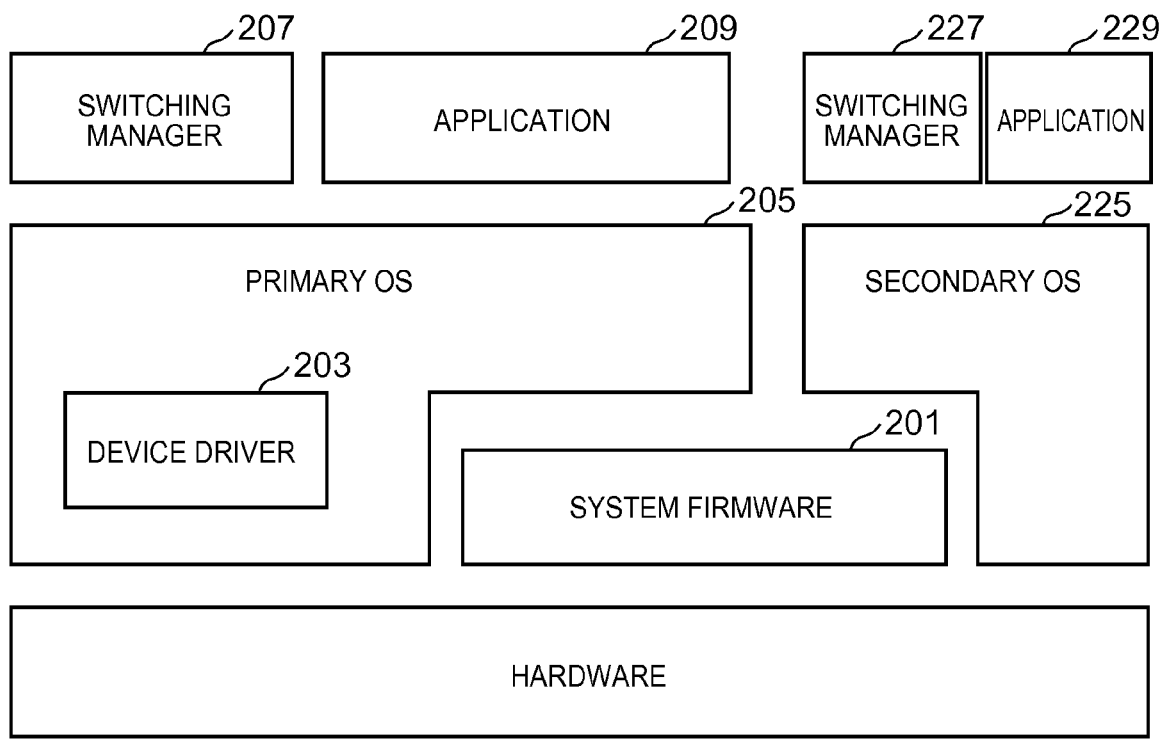
FIG. 3 is a diagram for describing the configuration of software executed by the computer 10.

FIG. 1 is a functional block diagram for describing the schematic configuration of representative hardware of a laptop or desktop computer 10. FIG. 2 is a diagram for describing the configuration of a register 31 mounted in an embedded controller (EC) 29. FIG. 3 is a diagram for describing the configuration of software executed by the computer 10. Since a large number of hardware and software configurations are well-known, the hardware and software configurations will be described only to the extent necessary for an understanding of the present application in this specification. In FIG. 1, a chipset 13 has interface functions of various standards and is connected to a CPU 11, a system memory 15, a GPU 17, a HDD 21, a trusted platform module (TPM) 23, a network module 25, a firmware ROM 27, an EC 29, and the like.

A touch screen 19 is connected to the GPU 17. The chipset 13 includes a direct memory access (DMA) controller 14. The firmware ROM 27 stores system firmware 201 (FIG. 3) such as a unified extensible firmware interface (UEFI) or BIOS. The system firmware 201 performs processing related to the switching of operating environment in this embodiment, in addition to POST such as a device test or initialization at the startup of a computer. The CPU 11 always executes the system firmware 201 from a predetermined address (reset vector) when a reset is performed in one of the methods: a power-on reset in which the power supply of the CPU 11 is restarted; a hardware reset in which a reset signal is sent to the CPU 11; and a software reset in which a program executed by the CPU 11 generates a reset signal.

In this embodiment, the system firmware 201 performs the most part of switching processing of operating environments. The shift from the operating environment of an OS to the operating environment of the system firmware 201 is performed by resetting the CPU 11. The system firmware 201 needs to recognize the configuration of the operating environment or whether switching processing is required and to determine an execution path when the CPU 11 is reset. The EC 29 has a register 31 for setting a flag for determining the execution path of the system firmware 201.

FIG. 2 illustrates one embodiment of the configuration of the register 31. The EC 29, which includes a CPU, a RAM, a ROM and the like, controls the power state, the power supply, and the temperature of the computer 10. The power supply of the register 31 is maintained even in a power-off state and any of the system firmware 201, a primary OS 205, and a secondary OS 225 is able to access the register 31. A set flag 31a indicates that the current operating environment is a dual-OS operating environment and an unset flag 31a indicates that the current operating environment is a single-OS operating environment.

In the dual-OS operating environment, a set flag 31b expresses that the operating environment at that time is the operating environment of the secondary OS 225 and an unset flag 31b expresses that the operating environment is the operating environment of the primary OS 205. In the single-OS operating environment, a set flag 31c expresses that a boot OS is the secondary OS 225 and an unset flag 31c expresses that the boot OS is the primary OS 205. A flag 31d expresses whether the switching processing is required in the dual-OS operating environment.

The HDD 21, which is a startup disk, stores a boot image of software illustrated in FIG. 3. The boot image includes a boot image 253 (FIG. 7) of the primary OS including the primary OS 205, a switching manager 207, and an application 209 and a boot image 253 (FIG. 7) including the secondary OS 225, a switching manager 227, and an application 229.

Figure 7:
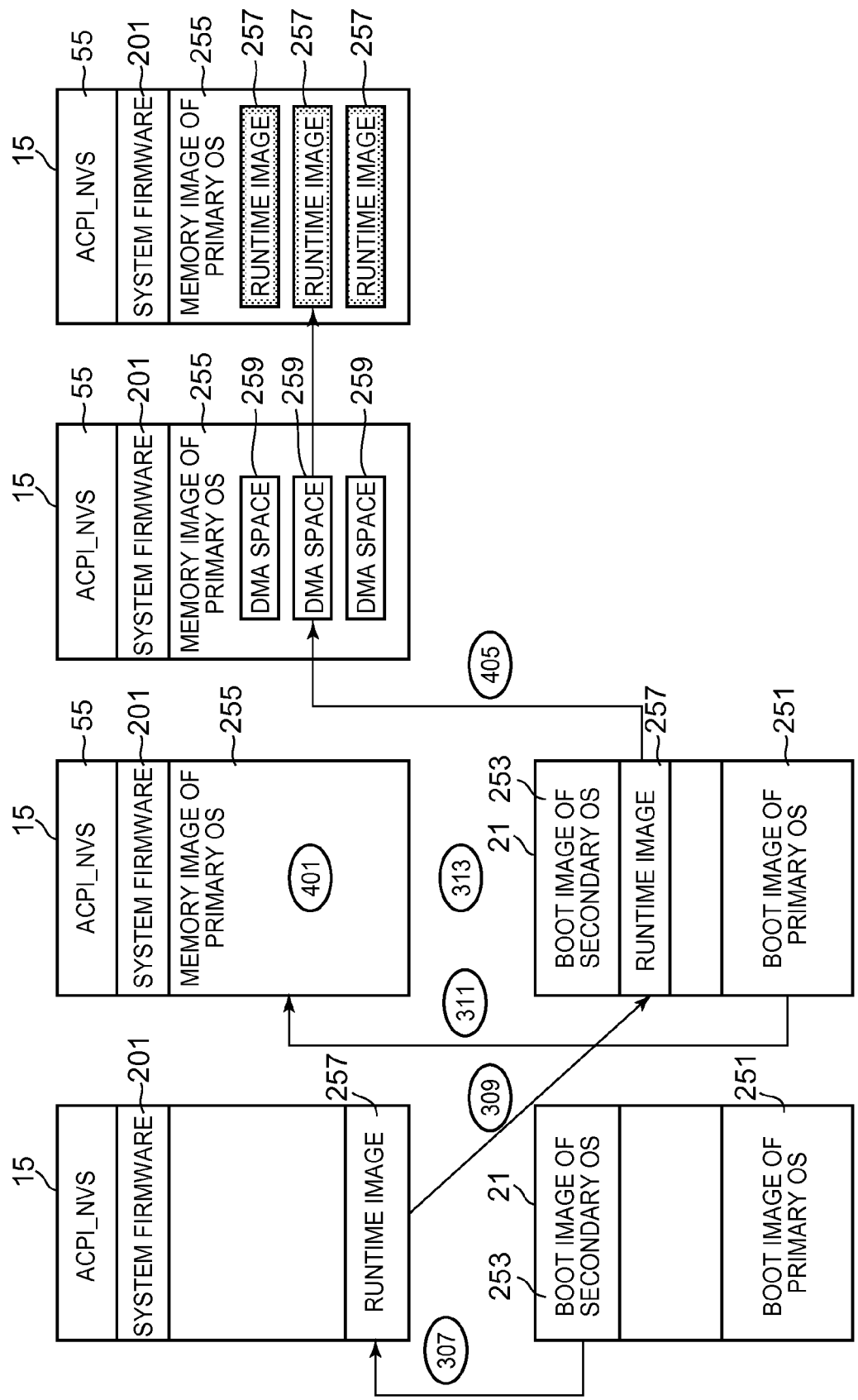
FIG. 7 is a diagram for describing the transition of a data configuration of a system memory 15 and a HDD 21 corresponding to the procedures in FIGS. 5 and 6.
Figure 8:
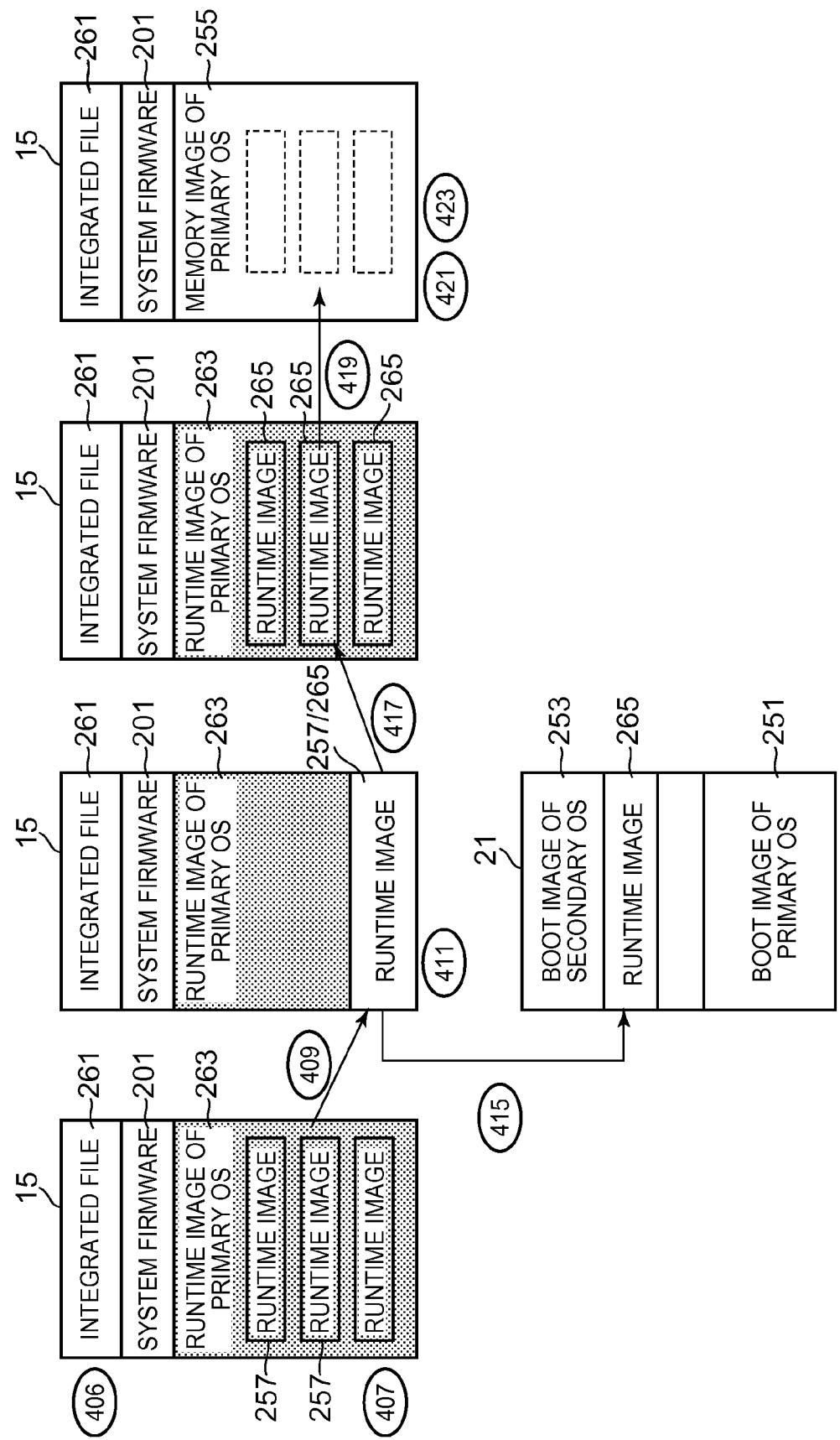
FIG. 8 is a diagram for describing the transition of the data configuration of the system memory 15 and the HDD 21 corresponding to the procedures in FIGS. 5 and 6.

In one embodiment illustrated by FIG. 3, the primary OS 205 is a large-scale program such as Windows® or MAC_OS® and the secondary OS 225 is a small-scale program such as Android® or Linux®. Under the operation of Android®, a touch screen 19 allows touch operation. The primary OS 205 includes a device driver 203 which controls the DMA controller 14. The device driver 203 performs processing of transferring a runtime image 257 (FIG. 7) from the HDD 21 to the system memory 15 and processing of releasing the transfer destination, i.e., a DMA space 259 (FIGS. 7 and 8). The details of the runtime image 257 are described below.

The switching manager 207 and the application 209 operate in the operating environment of the primary OS 205, while the switching manager 227 and the application 229 operate in the operating environment of the secondary OS 225. Each of the switching managers 207 and 227 displays a user interface for switching the operating environment on the touch screen 19 and performs switching processing of the operating environment through the corresponding OS.

Figure 4:
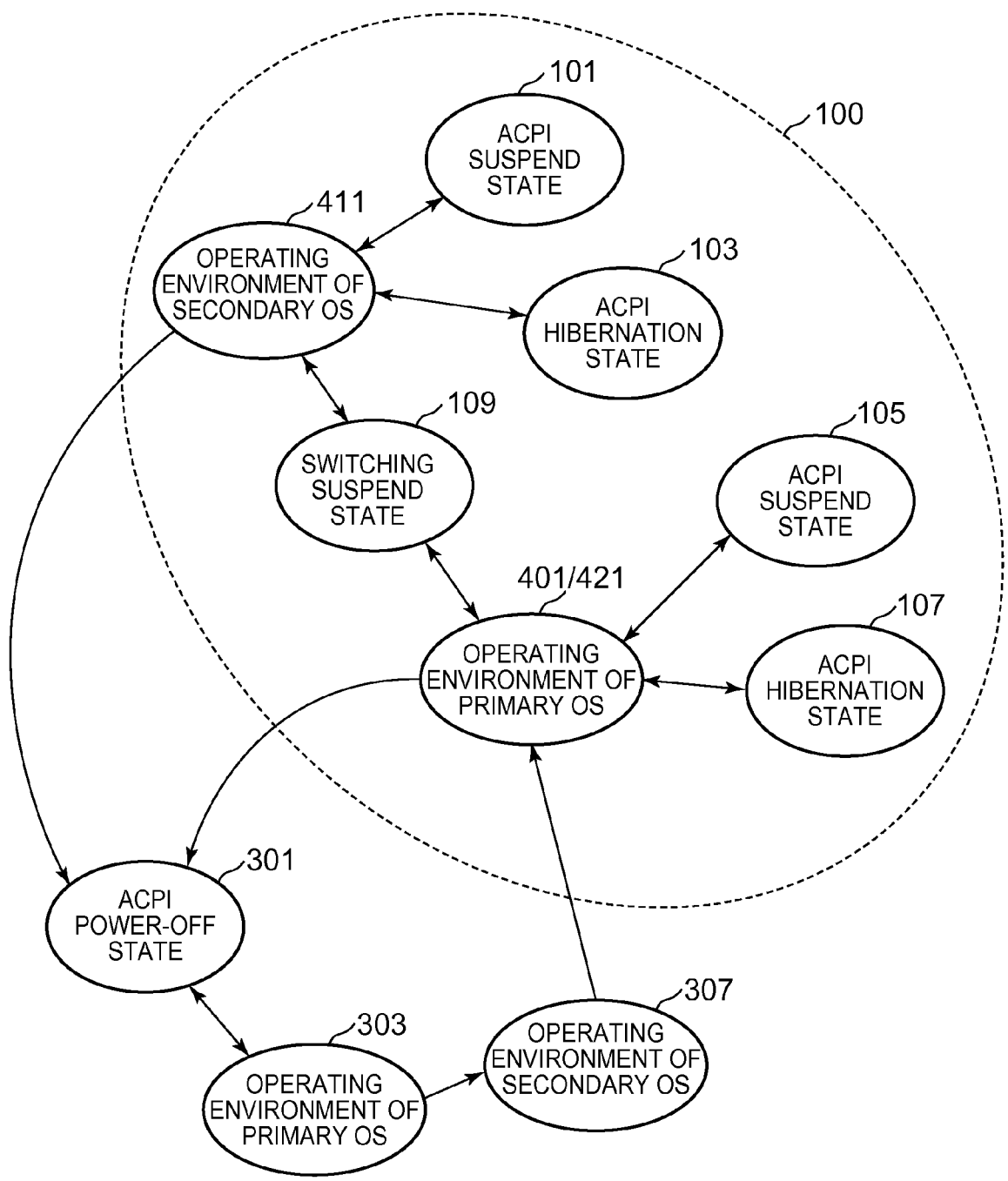
FIG. 4 is a state transition diagram for describing the operating state of the computer 10.
Figure 5:
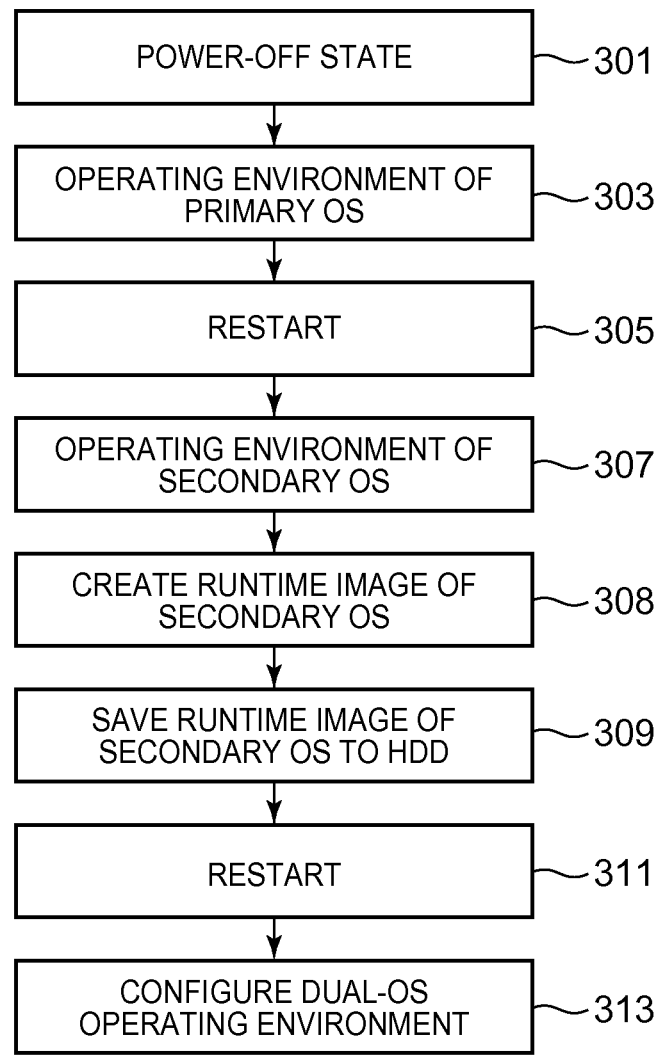
FIG. 5 is a flowchart illustrating a procedure for configuring a dual-OS operating environment in the computer 10.
Figure 6:
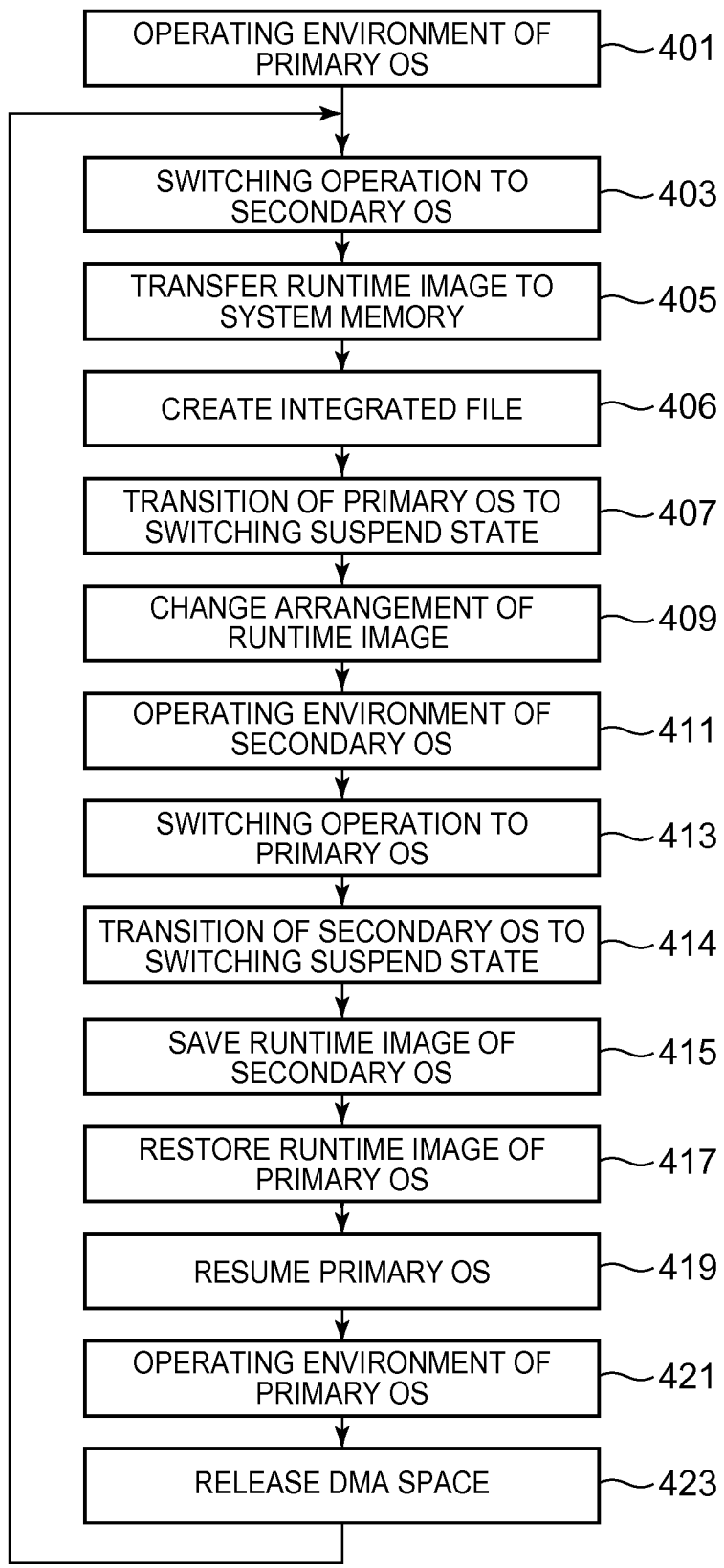
FIG. 6 is a flowchart illustrating a procedure for switching the computer 10 in which the dual-OS operating environment is configured from one operating environment to the other operating environment.

FIG. 4 is a state transition diagram for describing the operating state of the computer 10. FIGS. 5 and 6 are flowcharts illustrating procedures by which the computer 10 switches the operating environment. FIGS. 7 and 8 are diagrams for describing the transition of the data configuration of the system memory 15 and the HDD 21 corresponding to the procedures of FIGS. 5 and 6. In FIGS. 4, 7, and 8, the same reference numerals are appended to the elements corresponding to the steps of the procedures in FIGS. 5 and 6.

FIG. 5 illustrates a procedure for configuring a dual-OS operating environment in the computer 10. In block 301, the computer 10 is in the power-off state and the flags 31a to 31d are unset. When power is turned on in block 303, the CPU 11 executes the system firmware 201 to start booting from the reset vector. The system firmware 201 loads the boot image 251 (FIG. 7) of the primary OS stored in the HDD 21 with reference to flags 31a and 31c. At this time, a memory image 255 of the primary OS 205 illustrated in FIG. 9 is stored in the system memory 15.

Here, the operating environment is constituted by the memory image 255 stored in the system memory 15, such as the OS, application, or other program code, data indicating a program state, and user data created by an application, and state information (system context) indicating the internal state retained by the register, a cache, and a pointer of all kinds of hardware including the CPU 11 operating in the aforementioned operating environment. The number of operating environments coincides with the number of executable OSs. In this specification, description is made for a method of switching between two operating environments (dual-OS operating environments), though the present application is also applicable to a method of switching between three or more operating environments.

Figure 9:
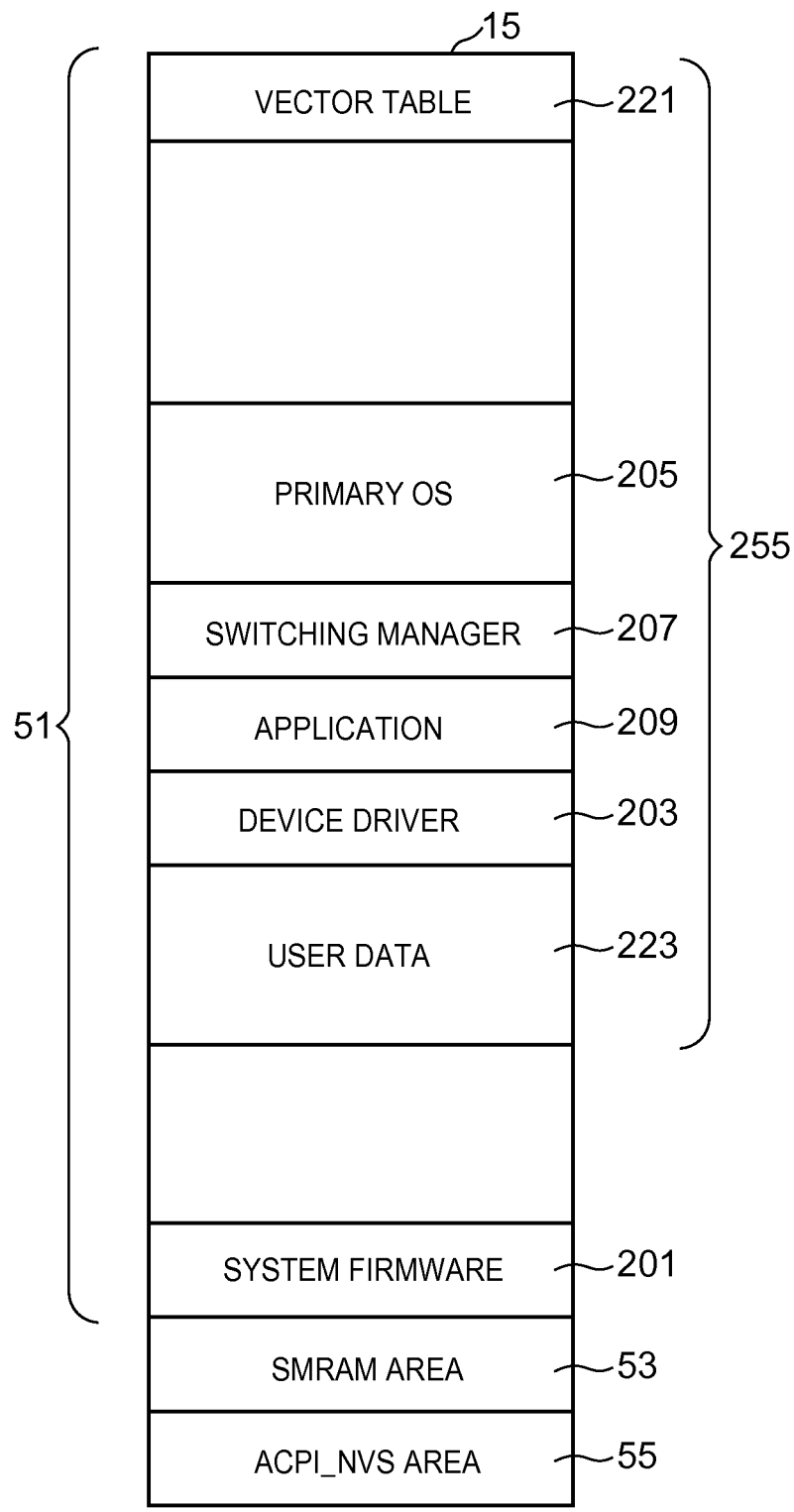
FIG. 9 is a diagram for describing the data configuration of the system memory 15 in a state where the operating environment of a primary OS 205 is established.

FIG. 9 is a diagram for describing the data configuration of the system memory 15 in a state where the operating environment of the primary OS 205 is established in the computer 10 in the single-OS operating environment. As an example, the system memory 15 may be assumed to be 8 GB in size. The system firmware 201 allocates the most of a physical address space 51 as memory resources, except an SMRAM area 53 and an ACPI_NVS area 55, to the operating environment of the primary OS 205 at booting. In addition, the system firmware 201 allocates other hardware resources so that the maximum function is available to the extent possible.

The boot image 251 of the primary OS is loaded into the physical address space 51 and stored as the memory image 255. The primary OS 205 maps a virtual address space provided to a process onto the physical address space 51 or, in the case of insufficient physical address space 51, swaps out the virtual address space to the virtual memory of the HDD 21. At this time, the computer 10 is operating in the single-OS operating environment and the memory capacity of the system memory 15 can be utilized at a maximum in the operating environment of the primary OS 205. In this embodiment, however, even in the dual-OS operating environment, it is possible to provide the operating environment of the primary OS 205 with memory resources of the same size as the single-OS operating environment.

In the physical address space 51, a RAM disk area into which the system firmware 201 is loaded is defined. The RAM disk area is a memory area accessible only from the system firmware 201 and not accessible from the primary OS 205. The memory image 255 of the primary OS is a file group which is executed, referenced, or stored in the operating environment of the primary OS 205 and includes a vector table 221, the primary OS 205, the switching manager 207, the application 209, the device driver 203, and user data 223.

The SMRAM area 53 is accessible only from the system firmware when the system operates in the system management mode (SMM). An SMI handler is loaded into the SMRAM area 53 and further a state save map (SSM) area is secured where the SSM area is a storage area for storing a context such as the register or pointer just before the CPU 11 shifts to the system management mode (SMM). The ACPI_NVS area 55 is a physical address space accessible from any of the primary OS 205, the secondary OS 225, and the system firmware 201. In this embodiment, the ACPI_NVS area 55 is used to exchange information necessary for switching the operating environment.

The computer 10 configures a dual-OS operating environment by default at the startup from the power-off state (S5 state of ACPI). In block 305, the switching manager 207, which has started the operation after the completion of the boot, recognizes that the current operating environment is the single-OS operating environment by referencing the flag 31a in the register 31. In the case where the dual-OS operating environment has already been configured, the processing proceeds to block 401 of FIG. 6. The switching manager 207 sets a flag 31c, which indicates that the next boot OS is the secondary OS 225, in the register 31 and restarts the computer 10 through the primary OS 205. At this time, the power supply of the system memory 15 stops temporarily and the memory content disappears.

In block 307, the reset CPU 11 executes the system firmware 201 to start booting. The system firmware 201 executes POST and then unsets the flag 31c after recognizing that the current boot OS is the secondary OS 225 in the single-OS operating environment with reference to the flags 31a and 31c in the register 31, and further sets the flag 31b indicating the operating environment of the secondary OS 225.

The system firmware 201, which has completed pre-boot processing such as POST and authentication, passes the access right of the CPU 11 to the boot loader of the secondary OS 225. Thereupon, the boot image 253 (FIG. 7) of the secondary OS is loaded. In this operation, the memory image of the secondary OS 225 is stored in the physical address space 51 so as to have the data configuration corresponding to the memory image 25.

Although the hardware resources of the computer 10 are shared by the operating environment of the primary OS 205 and the operating environment of the secondary OS 225, the system firmware 201 restricts the hardware resources given to the secondary OS 225 in comparison with the primary OS 205. In one example, the primary OS 205 is given the maximum physical address space available to the OS of the system memory 15, while the secondary OS 225 is given a physical address space of 1 GB smaller than the maximum physical address space.

The restriction on the memory resources given to the operating environment of the secondary OS 225 is intended to form the physical address space of the secondary OS 225 within the physical address space 51 in which the memory image 255 is secured. Therefore, the system memory 15 needs to have a size which does not cause a problem in the operating environment of the primary OS 205 even in the case of securing the physical address space of the secondary OS 225. The required size of the system memory 15 depends on the scale of the primary OS 205 and the scale of the secondary OS 225.

In the above, the system firmware 201 is able to inhibit the allocation of the hardware resources unnecessary for the secondary OS 225 or to cause such hardware resources to be used with low functions. For example, for the operating environment of the secondary OS 225, it is possible to reduce the power consumption by decreasing the clock frequency of the CPU 11 or by stopping a coprocessor. Moreover, in the operating environment of the secondary OS 225, security can be improved by restricting the use of a built-in or external storage device. The reduction in power consumption and the security improvement in the operating environment of the secondary OS 225 facilitate the use of the secondary OS in the mobile environment.

Upon the completion of the loading of the boot image 253 of the secondary OS, user data generated by the application 229 which works automatically is added to the memory image and further the switching manager 227 starts the operation. The switching manager 227 recognizes that the current operating environment is a single-OS operating environment with reference to the flag 31a. In block 308, the switching manager 227 generates a switching file for configuring the operating environment of the dual OS 225, writes the switching file into the ACPI_NVS area 55, and requests the secondary OS 225 to generate the runtime image 257.

The secondary OS 225 stores the system contexts of the CPU 11 and other devices into the system memory 15. A snapshot stored in the system memory 15 at a certain time point including the memory image and the system contexts is referred to as "runtime image," here. The runtime image 257 includes a file for activating the operating environment of the secondary OS 225 and restoring the power-on state.

Upon the completion of the generation of the runtime image, in block 309, the secondary OS 225 resets the CPU 11 while maintaining storage of the system memory 15 and then passes the access right to the system firmware 201. The system firmware 201 references the switching file in the ACPI_NVS area 55 and saves the runtime image 257 stored in the system memory 15 to the HDD 21. In this process, the system firmware 201 is able to write the address and size of the saving destination of the runtime image into the ACPI_NVS area 55 to notify the operating environment of the primary OS 205.

The saving of the runtime image 257 may be performed by the switching manager 227, instead of the system firmware 201. For this purpose, for example, the system firmware 201 copies the runtime image 257 into another area of the system memory 15 and then resumes the runtime image 257 before starting the operation of the operating environment of the secondary OS 225. Thereafter, the switching manager 227 is able to save the copied runtime image to the HDD 21.

The system firmware 201, which has saved the runtime image 257, sets the flag 31*a* in the register 31 to express the completion of the configuration of the dual OS and restarts the computer 10 in block 311. The system firmware 201, which has started the execution by the reset of the CPU 11, checks the flags 31*a* and 31*c* and then boots the primary OS 205. The runtime image 257, which has been stored in the system memory 15, disappears, the system memory 15 stores the memory image 255 of the primary OS 205 illustrated in FIG. 9, and the computer 10 operates in the operating environment of the primary OS 205.

The procedure from block 301 to block 311 is automatically executed. In block 313, in the computer 10, there is configured the dual-OS operating environment 100 (FIG. 4) where the HDD 21 stores the runtime image 257 of the secondary OS and where the system memory 15 stores the memory image 255 of the primary OS. In FIG. 4, the dual-OS operating environment 100 includes operating environments 401 and 421 of the primary OS, a switching suspend state 109, an operating environment 411 of the secondary OS, an ACPI suspend state (S3 state) 101 or 105, and an ACPI hibernation state (S4 state) 103 or 107. The ACPI suspend state and the ACPI hibernation state are power states defined by ACPI.

The primary OS is able to transition from the operating environment 401 or 421 to the ACPI suspend state 105 or the ACPI hibernation state 107 and is able to resume the operating environment 401 or 421 of the primary OS before the transition. Furthermore, the operating environment of the primary OS is able to be rapidly switched to the operating environment of the secondary OS 225 when needed through the switching suspend state 109.

FIG. 6 illustrates a procedure for bidirectionally switching between the operating environment of the primary OS 205 and the operating environment of the secondary OS 225 in the computer 10 in which the dual-OS operating environment 100 is configured. In block 401, the computer 10 operates in the operating environment of the primary OS 205. Here, a user who wants to shift to the operating environment of the secondary OS 225 performs a switching operation to the operating environment of the secondary OS 225 through a user interface provided by the switching manager 207 in block 403. In block 405, the switching manager 207 starts the processing for transferring the runtime image 257 of the secondary OS 225, which has been saved in the HDD 21 through the device driver 203, to a predetermined location of the physical address space 51 in which the memory image 255 of the primary OS 205 is stored.

Normally, the OS assigns a memory area requested by an application or a device to a logical address space and maps the logical address space to a physical address space. In the case of an insufficient physical address space, the OS swaps any part of the physical address space out to a virtual memory space provided in the HDD 21. The physical address space of the transfer destination of the runtime image, however, is not swapped out at present and needs to be made a memory area assured not to be swapped out during a time period from the transfer of the runtime image 257 to the stop of the operation in the operating environment of the primary OS 205.

The primary OS 205 is able to allocate the foregoing memory area as an area to be secured at the occurrence of a DMA request. If the device driver 203 makes a system call to request the primary OS 205 to allocate the a memory area (for example, of 1 GB in this embodiment) necessary as the physical address space of the secondary OS 225 as a memory area for use in DMA, the primary OS 205 sends back predetermined address and size in the allocated physical address space 51.

In the case where the primary OS 205 cannot secure a continuous physical address space of 1 GB in the physical address space 51, a set of discrete memory areas may be secured in some cases. If the size of the physical address space used by the secondary OS 225 is too large relative to the size of the system memory 15 and the primary OS 205 cannot secure the requested physical address space, the primary OS sends back an error to the device driver 203. If so, the operating environment cannot be shifted to the operating environment of the secondary OS 225 at this time point. A user is able to perform a switching operation after releasing the physical address space inhibited to be swapped with some applications stopped.

The continuous memory area or discrete memory areas of the transfer destination secured in the physical address space 51 by the primary OS 205 in response to a request from the device driver 203 will be referred to as "DMA space 259," here. Subsequently, the device driver 203 reads out the runtime image 257 to the buffer area of the system memory 15 once and then transfers it to the DMA space 259. If the primary OS 205 is able to secure a physical address space not to be swapped out and to perform the DMA transfer of the runtime image 257, the DMA transfer is allowed to be used. Even when the runtime image 257 is transferred, the system context is not restored in the CPU 11 or other devices, and therefore the operating environment of the secondary OS 225 does not operate at this time point.

Although the operating environment of the secondary OS 225 is able to operate even if the DMA space 259 is composed of a plurality of discrete areas, a continuous physical address space loaded in block 307 enables the operating environment to be able to operate in a state where the runtime image 257 is created without any particular change in the secondary OS 225. In block 406, the switching manager 207 creates an integrated file 261 for moving the runtime image 257 stored in the DMA space 259 to the continuous physical address space of 1 GB having stored the runtime image 257 in block 308 and stores the integrated file 261 into the ACPI_NVS area 55.

The integrated file 261 is a file in which the address and data size of the transfer source and the address of the transfer destination are sequentially described so that the system firmware 201 is able to move a runtime image 257 in a discrete DMA space 259 to a continuous physical address space. In the case where the a continuous physical address space of the transfer destination is used in the operating environment of the primary OS 205, the data in the continuous physical address space is saved to another space once and then the runtime image 257 is transferred to the continuous physical address space.

The integrated file 261 also includes a procedure for returning the runtime image 257 from the continuous physical address space to the original discrete DMA space 259 and additionally returning a runtime image 263 (FIG. 8) constituting the operating environment of the primary OS 205 to the original position. Upon the completion of the creation of the integrated file 261, the switching manager 207 requests the primary OS 205 to transition to the switching suspend state 109 (FIG. 4) in block 407.

The switching suspend state 109 means a state where the system context of the operating environment which has been active so far is stored in the system memory 15, a runtime image is created, and the operation is stopped at the time of switching between the operating environment of the primary OS 205 and the operating environment of the secondary OS 225. In the switching suspend state, the memory image and the system context are maintained in the system memory 15 similarly to the ACPI suspend states 101 and 105 illustrated in FIG. 4. The power supply of the CPU 11, however, does not stop and the power supplies of the devices other than the CPU 11 can be controlled as needed. Therefore, in the switching suspend state, it is possible to reset the CPU 11 and to pass the access right to the system firmware 201 for operation. The primary OS 205 stores the system context and generates the runtime image 263.

The primary OS 205 is able to transition from the operating environment of the primary OS 205 to either one of the ACPI suspend state 105 and the switching suspend state 109. The switching manager 207 is able to control the transition destination by using the flag 31d in the register 31. The switching manager 207 sets the flag 31d indicating the switching processing in the register 31 through the secondary OS 225 and then resets the CPU 11.

In block 409, the CPU 11, which is reset by power-on reset, executes the system firmware 201, references the flags 31b and 31d in the register 31, recognizes an occurrence of switching processing from the operating environment of the primary OS 205 to the operating environment of the secondary OS 225, and reads the integrated file 261 in the ACPI_NVS area 55. The system firmware 201 copies the runtime image 257 stored in the discrete DMA space 259 to the continuous physical address space of 1 GB given to the operating environment of the secondary OS 225 in block 307 according to the procedure of the integrated file 261. Furthermore, the system firmware 201 sets the flag 31b and unsets the flag 31d to express that the operating environment is that of the secondary OS 225.

After the system firmware 201 passes the access right of the CPU 11 to the secondary OS 225 which constitutes the runtime image 257, a resume processing program restores the system context in each device and activates the operating environment of the secondary OS 225. As a result, in block 411, the computer 10 shifts to the operating environment of the secondary OS 225 which is the same as when the runtime image 257 is created in block 308. Upon the execution of the application 229, a new memory image is generated in the operating environment of the secondary OS 225.

As illustrated in FIG. 4, in the operating environment of the secondary OS 225, the secondary OS 225 is able to transition to the ACPI suspend state 101 or the ACPI hibernation state 103 and then to resume the original operating environment of the secondary OS 225. Moreover, it is possible to shift to the operating environment of the primary OS 205 through the switching suspend state 109. A user who wants to shift to the operating environment of the primary OS 205 performs a switching operation through a user interface provided by the switching manager 227 in block 413. The switching manager 227 generates a switching file for use in shifting to the operating environment of the primary OS 205 and writes the switching file into the ACPI_NVS area 55 in block 414. Furthermore, the switching manager 227 sets the flag 31d and requests the secondary OS 225 to shift to the switching suspend state 109.

The secondary OS 225 which has received the event stores the system contexts of the CPU 11 and other devices into the system memory 15 to generate a new runtime image 265 and then shifts to the switching suspend state 109. The reset CPU 11 executes the system firmware 201 and references the flags 31b and 31d in the register 31 to recognize that there is a need for switching processing for shifting from the operating environment of the secondary OS 225 to the operating environment of the primary OS 205.

In block 415, the system firmware 201 saves the runtime image 265 to the HDD 21 according to the procedure of the switching file in the ACPI_NVS area 55. At this time, the secondary OS 225 may store the runtime image 265 in such a way as to overwrite the runtime image 257 which has been saved earlier. The primary OS 205 needs to restore the state of the transition to the switching suspend state in block 407.

In the case where the system firmware 201 changes the arrangement of the runtime image 263 but the primary OS 205 does not recognize the change in block 409, the primary OS 205 cannot restore the above state. Therefore, the system firmware 201, which has saved the runtime image 265, reads the integrated file 261 in block 417 and returns the runtime image 263 of the primary OS 205 to the state immediately before the transition to the switching suspend state in block 407.

After the system firmware 201 unsets the flags 31b and 31d and then passes the access right of the CPU 11 to the primary OS 205 in block 419, the resume processing program restores the system context in each device for the primary OS 205 and activates the operating environment of the primary OS 205. In the computer 10, the operating environment of the primary OS 205 returns to the state immediately before the shift to the switching suspend state 109 in block 407.

Although data stored in the DMA space 259 has changed from the runtime image 257 to the runtime image 265 at this time, the DMA space 259 is not accessed in the operating environment of the primary OS 205 and therefore the resume is not affected. Although the DMA space 259 may be allocated to a fixed address of the physical address space 51 as the operating environment of the secondary OS 225 in the case of frequent switching between the operating environment of the primary OS 205 and the operating environment of the secondary OS 225, the DMA space 259 is able to be released to the operating environment of the primary OS 205 in each case and to be secured at the time of switching to the operating environment of the secondary OS 225.

In block 423, the switching manager 207 requests the primary OS 205 for release through the device driver 203, by which the secured DMA space 259 is released to the operating environment of the primary OS 205. Thereafter, the primary OS 205 is allowed to use the physical address space 51 including the DMA space 259. Subsequently, in the case of shifting to the operating environment of the secondary OS 225, the procedure starts from block 403.

The operating environment switching procedure has been described hereinabove with reference to a particular embodiment. The present application, however, is not limited to the above-described illustrative procedure only. The integration or segmentation of the steps as illustrated in FIGS. 5 and 6 can be included in the scope of the present application within the spirit of the present application. Moreover, a change in the order of the steps is also included in the scope of the present application as long as the effects of the present application can be obtained therefrom. The switching procedure according to the present application is as described in the appended claims.

In the case of three or more operating environments, the runtime image of the third operating environment can be copied to the DMA space 259 present in the physical address space given to the primary operating environment for switching. In this case, the second and subsequent operating environments are switched based in the primary operating environment. In another method, the runtime image of the third operating environment can be copied to the DMA space given to the second operating environment for switching. In this case, the operating environments are switched in order.

Although the switching of the operating environment has been described hereinabove with reference to an example that software cooperates with hardware as illustrated in FIG. 3, the present application may include hardware components for operation in cooperation of software and hardware. For example, a save unit may perform processing of saving the runtime image 257 or 265 to the HDD 21, a transfer unit may perform transfer processing from the HDD 21 to the system memory 15, and a switching unit may perform processing of switching between the operating environment of the primary OS 205 and the operating environment of the secondary OS 225 through the switching suspend state. The transfer unit is able to perform processing of securing a physical memory space inhibited to be swapped out in the system memory 15. Moreover, a release unit is able to perform processing of releasing the DMA space 259 to the operating environment of the primary OS 205.

While the present application has been described by using a particular embodiment illustrated in the accompanying drawings, the present application is not limited to the embodiment illustrated in the drawings, and naturally any conventionally known configuration may be used as long as the effect of the present application is achieved.

What is claimed is:

1. A method comprising:
    creating and storing a runtime image of a second operating environment, wherein the runtime image of the second operating environment comprises a memory snapshot in time of the second operating environment;
    operating in a first operating environment;
    determining, by a switching manager created by the first operating environment, that operation is to change from the first operating environment to the second operating environment;
    in response to determining that operation is to change from the first operating environment to the second operating environment, setting, by the switching manager, a flag of a register in an embedded controller to a first state;
    detecting that the flag is in the first state;
    transferring the runtime image to a portion of a system memory allocated to the first operating environment in response to detecting that the flag is in the first state and using an integrated file created by the switching manager of the first operating environment and stored in a memory region, wherein the integrated file comprises an address and size of the runtime image, instructions for returning the runtime image from the portion of the system memory to another location, and instructions for returning a runtime image of the first operating environment to the portion of the system memory;
    stopping the first operating environment by entering a suspend state;
    activating the runtime image and transitioning to operation in the second operating environment upon exiting the suspend state; and
    switching the flag from the first state to a second state in response to activating the runtime image and transitioning to operation in the second operating environment.

2. The method according to claim 1, wherein the portion of system memory is protected from being swapped out to a virtual memory for the time from the transfer of the runtime image until the stopping of the first operating environment.

3. The method according to claim 1, wherein the portion of system memory is a memory area allocated to DMA transfer in the first operating environment.

4. The method according to claim 1, wherein the portion of system memory is a set of discrete memory areas.

5. The method according to claim 4, wherein transferring the runtime image includes moving the runtime image stored in the discrete memory areas to a continuous memory area of the system memory in which the runtime image is stored.

6. The method according to claim 1, further comprising:
    creating and storing a new runtime image while operating in the second operating environment; and
    activating the first operating environment in response to a request to shift to the first operating environment.

7. The method according to claim 6, further comprising releasing the portion of system memory to the first operating environment.

8. The method according to claim 1, wherein stopping the first operating environment includes storing a system context of a device operating in the first operating environment and user data into the system memory.

9. The method according to claim 1, wherein creating and storing the runtime image of the second operating environment includes allocating a memory area of the system memory for the second operating environment that is smaller than the memory area allocated to the first operating environment, when booting from a power-off state.

10. The method according to claim 1, wherein the first operating environment enables the execution of an operating system installable on a desktop computer and the second operating environment enables the execution of an operating system installable on a table terminal.

11. The method according to claim 1, wherein operating in the first operating environment includes allocating greater memory resources usable in the system memory to the first operating environment than to the second operating environment and allocating hardware resources restricted more than those of the first operating environment to the second operating environment.

12. The method of claim 1, further comprising:
    copying the second operating system to a second physical address space which is present in a part of a first physical address space; and
    depriving the first operating system of the access right of a processor and giving the access right to the second operating system while maintaining storage of the system memory.

13. The method according to claim 12, further comprising:
    storing a new runtime image of the second operating system into the nonvolatile memory; and giving the access right of the processor to the first operating system.

14. A method according to claim 13, further comprising the first operating system using the second physical address space.

15. A computer comprising:
a processor;
    a system memory that stores a program executed by the processor;
    a nonvolatile memory that stores system firmware executed by the processor;
    a disk drive that stores a first operating system and a second operating system;
    a save unit that saves a runtime image of the operation of the second operating system from the system memory to the disk drive, wherein the runtime image of the operation of the second operating system comprises a memory snapshot in time of the operation of the second operating system;
    a switching manager created by the first operating system that determines that operation is to change from the first operating system to the second operating system and, in response to determining that operation is to change from the first operating system to the second operating system, sets a flag of a register in an embedded controller to a first state;
    a transfer unit that transfers the runtime image to the physical address space of the system memory in which the first operating system is loaded in response to detecting the flag is in the first state and using an integrated file created by the switching manager of the first operating system and stored in a memory region, wherein the integrated file comprises an address and size of the runtime image, instructions for returning the runtime image from the portion of the system memory to another location, and instructions for returning a runtime image of the first operating system to the portion of the system memory; and
    a switching unit that executes the second operating system after shifting the first operating system to a switching suspend state and switches the flag from the first state to a second state in response to executing the second operating system.

16. The computer according to claim 15, wherein the switching unit resumes the first operating system after saving the runtime image of the operation of the second operating system to the disk drive.

17. The computer according to claim 16, wherein the transfer unit transfers the runtime image to a physical address space inhibited to be swapped out by the first operating system.

18. The computer according to claim 17, further comprising a release unit that releases the physical address space storing the runtime image to the first operating system.

19. A program product comprising a non-transitory computer readable storage medium that stores code executable by a processor to perform:
    creating and storing a runtime image of a second operating environment, wherein the runtime image of the second operating environment comprises a memory snapshot in time of the second operating environment;
    operating in a first operating environment;
    determining, by a switching manager created by the first operating environment, that operation is to change from the first operating environment to the second operating environment;
    in response to determining that operation is to change from the first operating environment to the second operating environment, setting, by the switching manager, a flag of a register in an embedded controller to a first state;
    detecting that the flag is in the first state;
    transferring the runtime image to a portion of a system memory allocated to the first operating environment in response to detecting that the flag is in the first state and using an integrated file created by the switching manager of the first operating environment and stored in a memory region, wherein the integrated file comprises an address and size of the runtime image, instructions for returning the runtime image from the portion of the system memory to another location, and instructions for returning a runtime image of the first operating environment to the portion of the system memory;
    stopping the first operating environment by entering a suspend state;
    activating the runtime image and transitioning to operation in the second operating environment upon exiting the suspend state; and
    switching the flag from the first state to a second state in response to activating the runtime image and transitioning to operation in the second operating environment.

20. The computer program according to claim 19, wherein the code is further executable to perform restoring the runtime image and activating the first operating environment.

* * * * *